(12) United States Patent
    Ito (10) Patent No.: US 10,894,459 B2
(45) Date of Patent:      Jan. 19, 2021

(54) AIR-CONDITIONING REGISTER

(71) Applicant: TOYODA GOSEI CO., LTD., Kiyosu (JP)

(72) Inventor: Kenichi Ito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 377 days.

(21) Appl. No.: 15/791,592

(22) Filed: Oct. 24, 2017

(65)        Prior Publication Data

US 2018/0147914 A1     May 31, 2018

(30)        Foreign Application Priority Data

Nov. 30, 2016    (JP) ................ 2016-232931

(51) Int. Cl.
    *B60H 1/00*        (2006.01)
    *B60H 1/34*        (2006.01)

(52) U.S. Cl.
    CPC ....... *B60H 1/00671* (2013.01); *B60H 1/3421* (2013.01); *B60H 2001/00707* (2013.01); *B60H 2001/00714* (2013.01)

(58) Field of Classification Search
    CPC .......................................... B60H 2001/00714
    See application file for complete search history.

(56)        References Cited

U.S. PATENT DOCUMENTS 6,047,951 A *    4/2000  Ito ............... B60H 1/00678
                                                   251/306
    2006/0252362 A1* 11/2006 Ito ............... B60H 1/00678
                                                   454/156
    2010/0139308 A1   6/2010 Eguchi et al.
    2015/0360536 A1  12/2015 Terai et al.
    2017/0248237 A1*  8/2017 Kabierschke ....... F24F 13/1406

FOREIGN PATENT DOCUMENTS

JP      2009-234285 A    10/2009
    JP      2015-123874 A     7/2015
    JP      2016-003821 A     1/2016

* cited by examiner

*Primary Examiner* — Steven B McAllister
*Assistant Examiner* — Elizabeth M. May
(74) *Attorney, Agent, or Firm* — Posz Law Group, PLC (57)        ABSTRACT

An air-conditioning register includes a retainer having an airflow passage, and a shut-off damper, which is pivoted about a damper shaft between opening and closing positions for the airflow passage. The shut-off damper has opposed side sections, which are opposed to each other with the damper shaft located therebetween, and a distal sealing portion. The distal sealing portion includes a curved surface and a planar surface. The curved surface is arranged on the trailing side in a pivoting direction of the shut-off damper towards the closing position. The planar surface is arranged on the leading side in the pivoting direction in a manner defining an acute angle with respect to an opposing direction of the opposed side sections. At least the planar surface is a textured surface having raised features each having a height of 110 μm±50 μm.

12 Claims, 6 Drawing Sheets

AIR-CONDITIONING REGISTER

BACKGROUND OF THE INVENTION

The present invention relates to an air-conditioning register having a shut-off damper that selectively opens and closes an airflow passage.

Figure 6:
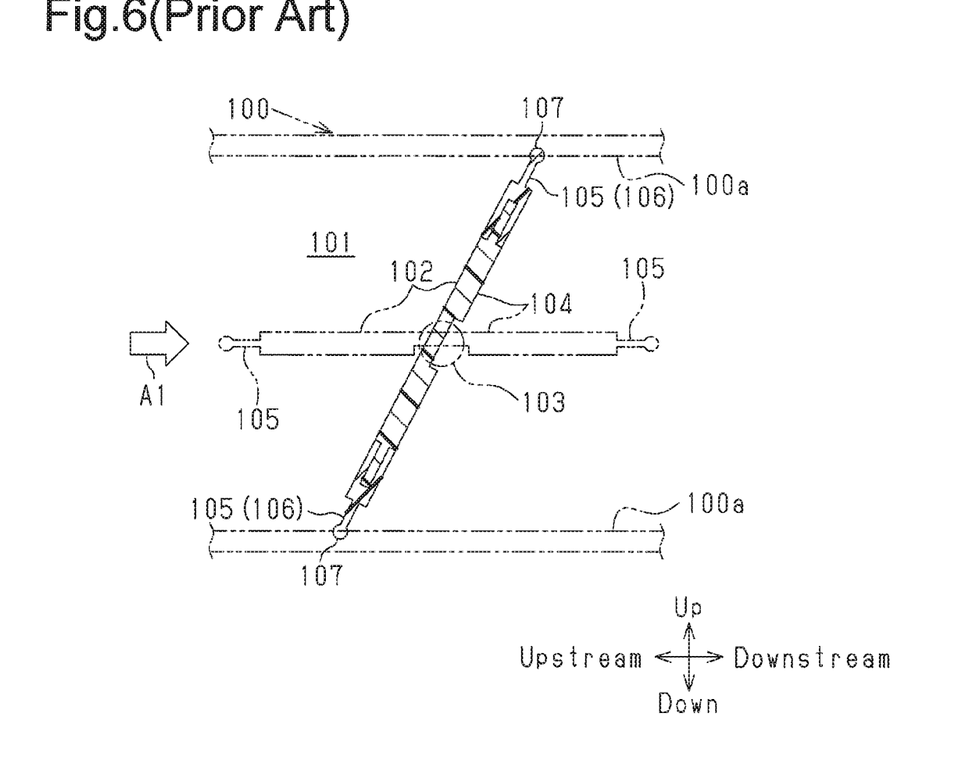
FIG. 6 is a transverse cross-sectional view showing a retainer and a shut-off damper of a conventional air-conditioning register.

An air-conditioning register, which blows out air delivered from an air-conditioning device, is incorporated in, for example, an instrument panel of a vehicle. The air-conditioning register includes a tubular retainer that has an airflow passage. The downstream end of the retainer in the flow direction of the air configures an outlet. In the air-conditioning register, the direction of the air blown out from the outlet is adjusted by inclining a fin arranged in the retainer. A shut-off damper 102, which is illustrated in FIG. 6, is arranged upstream of the fin in the retainer (see, for example, Japanese Laid-Open Patent Publication No. 2016-3821).

The shut-off damper 102 includes a damper body 104 having a damper shaft 103 and a sealing portion 105, which is formed along an outer peripheral edge section of the damper body 104 to surround the damper body 104 using softer material than the damper body 104. The shut-off damper 102 is pivoted about the damper shaft 103 as the point of support between an opening position (represented by the long dashed double-short dashed lines in FIG. 6) for opening an airflow passage 101 of a retainer 100 and a closing position (represented by the solid lines in the drawing) for closing the airflow passage 101.

The sealing portion. 105 has two opposed side sections 106, which are opposed to each other with the damper shaft 103 located between the opposed side sections 106 and extend parallel to the damper shaft 103. The opposed side sections 106 are configured such that, if elastic deformation of the sealing portion 105 at the closing position did not happen, a section of each of the opposed side sections 106 at the closing position would extend into an inner wall surface 100a of the retainer 100.

The sealing portion 105 also includes a distal sealing portion 107, which has a substantially circular cross section, at the position farthest from the outer peripheral edge section of the damper body 104.

Figure 7:
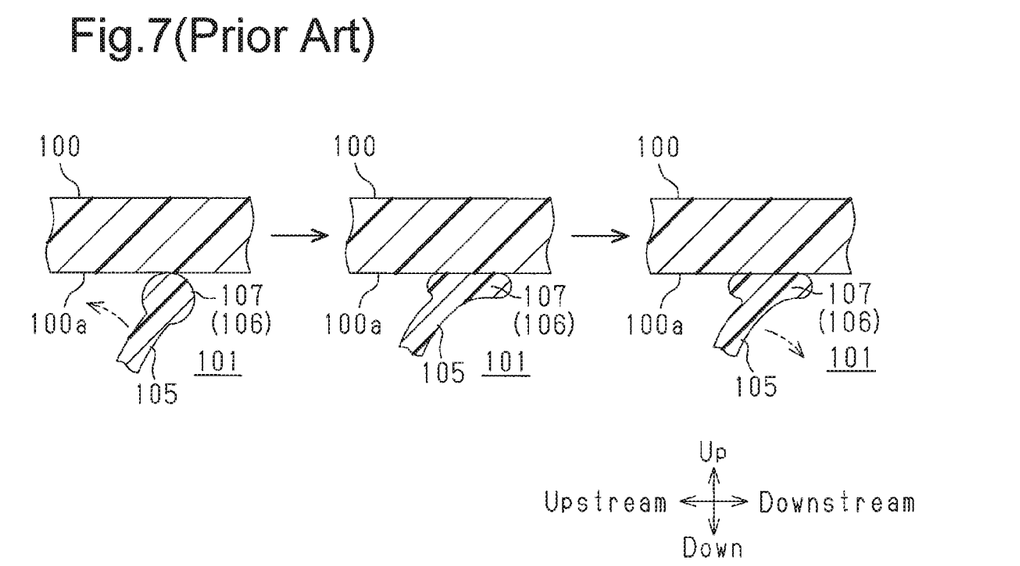
FIG. 7 is transverse cross-sectional views each showing a section of the conventional air-conditioning register to illustrate the manner in which the shape of the distal sealing portion changes as the shut-off damper is pivoted.

When the shut-off damper 102 is pivoted from the opening position to the closing position, the distal sealing portion 107 first comes into contact with the inner wall surface 100a of the retainer 100, as shown on the left side of FIG. 7. As the shut-off damper 102 is pivoted continuously in the direction represented by the long dashed double-short dashed arrow, the distal sealing portion 107 is elastically deformed and comes into contact with the inner wall surface 100a in a tight contact state, as shown in the middle of FIG. 7.

SUMMARY OF THE INVENTION

In the above-described conventional air-conditioning register, the distal sealing portion 107, which is elastically deformed, sticks to the inner wall surface 100a of the retainer 100 in a suction-cup-like manner. That is, a substantial vacuum is produced in the space between the distal sealing portion 107 and the inner wall surface 100a. The distal sealing portion 107 thus adheres to the inner wall surface 100a.

As a result, when the shut-off damper 102 is pivoted from the closing position toward the opening position in the direction represented by the long dashed double-short dashed arrow on the right side in FIG. 7, the distal sealing portion 107 is maintained in a state adhering to the inner wall surface 100a even though the damper body 104 is urged to pivot. This produces great friction force between the distal sealing portion 107 and the inner wall surface 100a. As a result, noise is generated when the shut-off damper 102 is pivoted toward the opening position and the distal sealing portion 107 is separated (peeled off) from the inner wall surface 100a. This may cause discomfort to an occupant of the vehicle.

Accordingly, it is an objective of the present invention to provide an air-conditioning register capable of restraining noise generation at the time a shut-off damper is pivoted from a closing position toward an opening position and a distal sealing portion is separated from an inner wall surface of a retainer.

One aspect of the present invention is an air-conditioning register comprising a tubular retainer that has an airflow passage and a shut-off damper arranged in the retainer, wherein the shut-off damper is pivoted about a damper shaft between an opening position for opening the airflow passage and a closing position for closing the airflow passage. The shut-off damper has a damper body having an outer peripheral edge section and a sealing portion that surrounds the outer peripheral edge section and is formed of a softer material than the damper body. The sealing portion includes two opposed side sections that are opposed to each other with the damper shaft located between the opposed side sections and extend parallel to the damper shaft and a distal sealing portion that is arranged at a position in each of the opposed side sections farthest from the outer peripheral edge section. The distal sealing portion contacts an inner wall surface of the retainer in an elastically deformed state at the closing position and is configured such that, if elastic deformation of the sealing portion did not happen, a section of each opposed side section would extend into the inner wall surface of the retainer at the closing position. The distal sealing portion includes a curved surface and a planar surface that extends continuously to the curved surface. The curved surface is arranged on a trailing side in a pivoting direction of the shut-off damper from the opening position to the closing position in a manner projecting in the direction opposite to the pivoting direction. The planar surface is arranged on a leading side in the pivoting direction in a manner defining an acute angle with respect to a direction in which the two opposed side sections are opposed to each other. At least the planar surface of the distal sealing portion is a textured surface having a plurality of raised features each having a height of 110 µm±50 µm.

In the air-conditioning register, at least a boundary portion of the curved surface of the distal sealing portion with respect to the planar surface may be the textured surface.

The sealing portion may include a flexible joint portion that joins the distal sealing portion and the damper body to each other.

The damper body may be made of polypropylene, and the sealing portion may be formed as a single component with the damper body using a thermoplastic elastomer.

The sealing portion may contain a silicone oil.

Other aspects and advantages of the present invention will become apparent from the following description, taken in conjunction with the accompanying drawings, illustrating by way of example the principles of the present invention.

DETAILED DESCRIPTION OF THE PREFERRED EMBODIMENTS

An air-conditioning register for a vehicle according to one embodiment will now be described with reference to the drawings.

In the following description, the direction in which the vehicle advances (moves forward) will be referred to as the front, and the reverse direction will be referred to as the rear. "Up" and "down" are defined with reference to the vertical direction of the vehicle. "Right" and "left" (the lateral or width direction of the vehicle) are defined with reference to the state in which the vehicle is viewed from the rear.

In the passenger compartment, the instrument panel is located in front of the front seats of the vehicle (the driver's seat and the front passenger seat). The instrument panel incorporates air-conditioning registers at the center and the sides with reference to the lateral direction. The main functions of the air-conditioning registers are to change the direction of the air that is delivered from the air conditioner (not shown) and blown into the passenger compartment and to adjust the amount of the blown air. The function of adjusting the blown air amount includes stopping the air blow.

Figure 1:
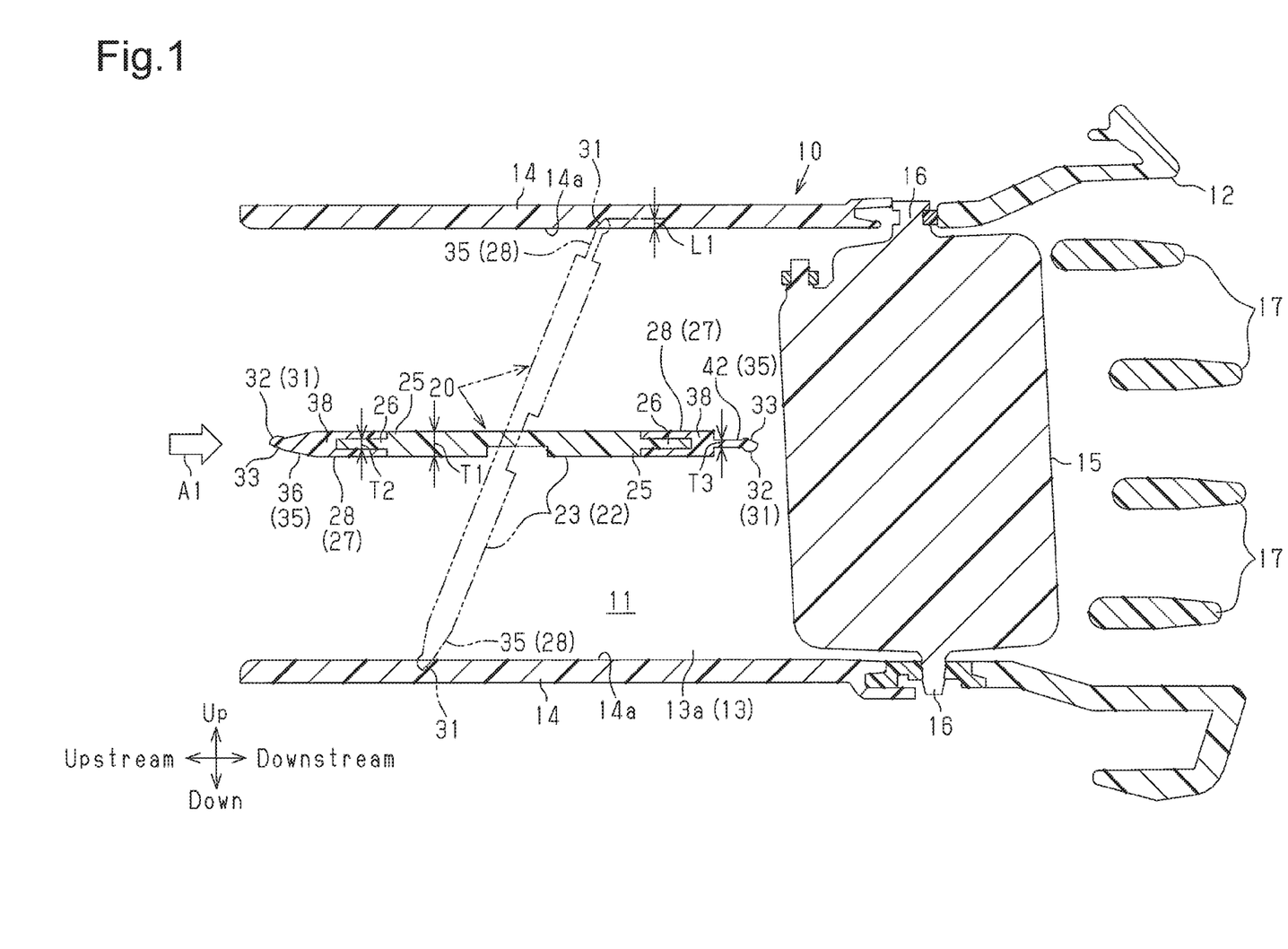
FIG. 1 is a transverse cross-sectional view showing the internal structure of an air-conditioning register according to an embodiment at the time a shut-off damper is located at an opening position.

As shown in FIG. 1, an air-conditioning register includes a retainer 10 and fins each as a basic component. Each of the components of the air-conditioning register will now be described.

<Retainer 10>

The retainer 10 joins an air duct (not shown) of an air-conditioning device and an opening (not shown) arranged in an instrument panel to each other. The retainer 10 is configured by components each made of hard plastic material and has a tubular shape with opposite open ends. The internal space of the retainer 10 configures a passage of air A1, which is delivered from the air-conditioning device (hereinafter, referred to as "the airflow passage 11"). Hereinafter, in the flow direction of the air A1, a side closer to the air-conditioning device will be referred to as "upstream" or "an upstream side" and a side farther from the air-conditioning device will be referred to as "downstream" or "a downstream side". The downstream end of the airflow passage 11 configures an outlet 12 for the air A1.

The airflow passage 11 is surrounded by four wall portions of the retainer 10. The four wall portions include two vertical wall portions 13, which are opposed to each other in the lateral direction, and two transverse wall portions 14, which are opposed to each other in the vertical direction. At least in an upstream section of the airflow passage 11, the two vertical wall portions 13 are parallel or substantially parallel to each other and the two transverse wall portions 14 are parallel or substantially parallel to each other.

<Fins>

Fins include downstream fins 17 and upstream fins 15. The downstream fins 17 are arranged in a state spaced apart in the vertical direction in the vicinity of the outlet 12 in the airflow passage 11. Support shafts (not shown) project outward in the lateral direction from corresponding opposite end surfaces of each of the downstream fins 17 in the lateral direction. Each downstream fin 17 is supported by the two vertical wall portions 13 through the associated two support shafts and is inclinable about the support shafts each as a point of support in the vertical direction.

The upstream fins 15 are arranged in a state spaced apart in the lateral direction at positions upstream of the downstream fins 17 in the airflow passage 11. Support shafts 16 project outward in the vertical direction from corresponding opposite end surfaces of each of the upstream fins 15 in the vertical direction. Each upstream fin 15 is supported by the two transverse wall portions 14 through the associated support shafts 16. The upstream fin 15 is thus inclinable about the support shafts 16 each as a point of support in the lateral direction.

In the above-described air-conditioning register, the air A1 flows along the upstream fins 15 and the downstream fins 17 when passing through the airflow passage 11. By inclining each upstream fin 15 about the associated support shafts 16 as the points of support in the lateral direction, the inclination of the upstream fin 15 in the lateral direction is changed. By inclining each downstream fin 17 about the associated support shafts as the points of support in the vertical direction, the inclination of the downstream fin 17 in the vertical direction is changed. The air A1 flows in the directions corresponding to the inclinations of the upstream fins 15 and the inclinations of the downstream fins 17 before being blown out of the outlet 12.

<Shut-off Damper 20>

In addition to the above-described basic configuration, the air-conditioning register includes a flat plate-like shut-off damper 20 at a position upstream of the upstream fins 15 in the retainer 10. The shut-off damper 20 is pivotable between an opening position and a closing position about two damper shafts 21 (see FIG. 2) each as a point of support. Specifically, one of the two damper shafts 21 is configured by a component separate from the shut-off damper 20 and is non-illustrated in FIG. 2. At the opening position, the shut-off damper 20 is in a state parallel or substantially parallel to the two transverse wall portions 14 (as represented by the solid lines in FIG. 1) in a middle section between the transverse wall portions 14, thus fully opening the airflow passage 11. At the closing position, the shut-off damper 20 is in a state inclined with respect to the transverse wall portions 14 (as represented by the long dashed double-short dashed lines in FIG. 1), thus closing the airflow passage 11.

Figure 2:
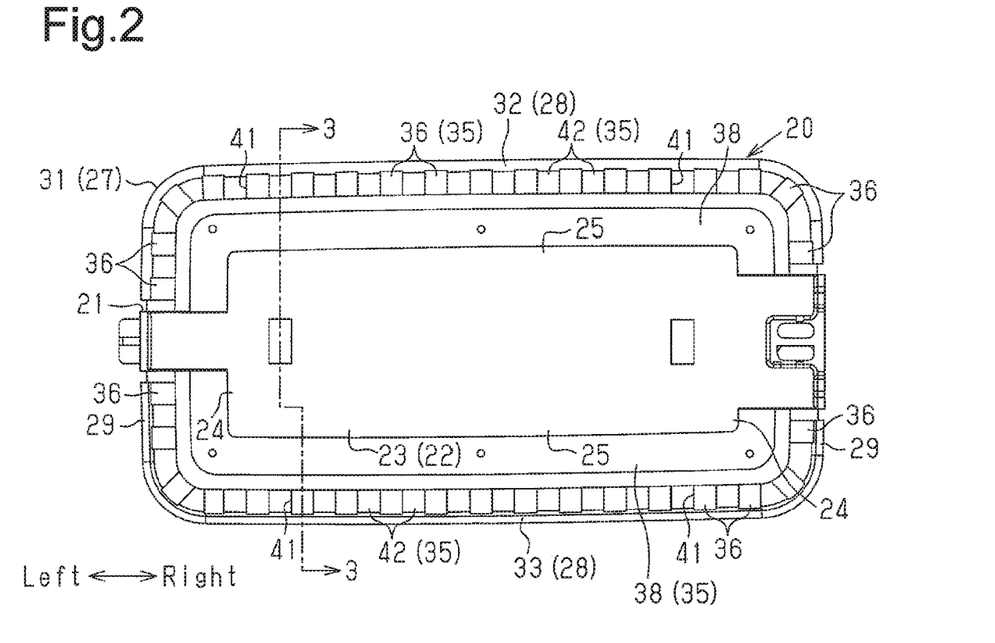
FIG. 2 is a front view showing the shut-off damper illustrated in FIG. 1.

The shut-off damper 20 includes a damper body 22 serving as a framework portion and a sealing portion 27.

The damper body 22 is made of polypropylene (PP), which is hard plastic material. Most of the damper body 22 is configured by a rectangular plate-like base portion 23, which has a thickness T1. An outer peripheral edge section of the base portion 23 has vertical edge sections 24, which are opposed to each other in the lateral direction, and transverse edge sections 25, each of which is perpendicular to the respective vertical edge sections 24.

On each of the transverse edge sections 25 of the base portion 23, a thin plate portion 26 is formed integrally with the base portion 23. The thin plate portion 26 has a thickness T2 (<T1), which is smaller than the thickness of the base portion 23, and extends along the transverse edge section 25 in the lateral direction.

The damper shafts 21 are arranged in correspondence with the respective vertical edge sections 24. The damper body 22 is supported by the two vertical wall portions 13 through the damper shafts 21.

The sealing portion 27 is made of a thermoplastic elastomer (TPE), which is a softer plastic material than the material of the damper body 22, and surrounds the outer peripheral edge section of the damper body 22. The thermoplastic elastomer is a polymer material that is plasticized at a high temperature, can be processed like plastic, and exhibits properties like those of an elastic rubber body (elastomer) at an ambient temperature.

In the present embodiment, the sealing portion 27 is made of an olefin-based thermoplastic elastomer (TPO: Thermoplastic Olefin). The TPO is a TPE in which the hard segment is composed of polyolefin such as PP or polyethylene (PE) and the soft segment is composed of a rubber element such as an ethylene-propylene rubber (EPM, EPDM).

The sealing portion 27 contains silicone oil. In other words, the sealing portion 27 is made of a silicone-oil-contained thermoplastic elastomer.

The sealing portion 27 is formed substantially along the full circumference of the outer peripheral edge section of the damper body 22 except for the vicinities of the damper shafts 21 to extend along the outer peripheral edge section of the damper body 22.

The sealing portion 27 has two opposed side sections 28 and two joint side sections 29. The opposed side sections 28 are opposed to each other with the two damper shafts 21 located between the opposed side sections 28 and extend in the axial direction of the damper shafts 21. The joint side sections 29 are opposed to each other in the lateral direction and each join the corresponding end sections of the two opposed side sections 28 to each other.

The opposed side sections 28 and the joint side sections 29 exert different functions. Each of the joint side sections 29 is constantly close to or in slight contact with an inner wall surface 13a of the corresponding one of the vertical wall portions 13 regardless of the inclination angle of the shut-off damper 20. It is preferable to set the clearance between each joint side section 29 and the corresponding inner wall surface 13a to 0 to 0.5 mm. If the clearance is in this range, the amount of the air A1 leaking through the gap between each joint side section 29 and the corresponding vertical wall portion 13 is maintained in an acceptable range. Also, the joint side sections 29 are unlikely to rub on the corresponding vertical wall portions 13 and the manipulation load for pivoting the shut-off damper 20 is unlikely to be excessively great. Decrease of durability is thus restrained.

As illustrated in FIGS. 1, 2, and 3A to 3C, the dimension M1 of the shut-off damper 20 in the direction in which the opposed side sections 28 are opposed to each other (as well as the distance between the opposed side sections 28) is set to such a dimension such that, if the sealing portion 27 did not flex at the time the shut-off damper 20 is pivoted to the closing position, a section of each opposed side section 28 would overlap with the corresponding transverse wall portion 14 by a lap amount L1. It is preferable that the lap amount L1 be 1.0 mm to 1.5 mm. If the lap amount L1 is in this range, the manipulation load for pivoting the shut-off damper 20 to the closing position is appropriate. Also, even if the dimensions of the retainer 10 and the dimensions of the shut-off damper 20 are varied to the conceivable maximum extent, the opposed side sections 28 could overlap with the corresponding transverse wall portions 14.

With reference to FIGS. 1 and 4A to 4C, the opposed side sections 28 and the joint side sections 29 both include a distal sealing portion 31 and a joint portion 35. The distal sealing portion 31 is located at the position farthest from the outer peripheral edge section of the damper body 22 in the sealing portion 27. When the shut-off damper 20 is at the closing position, the distal sealing portion 31 contacts an inner wall surface 14a of each transverse wall portion 14 in an elastically deformed state.

Figure 3A:
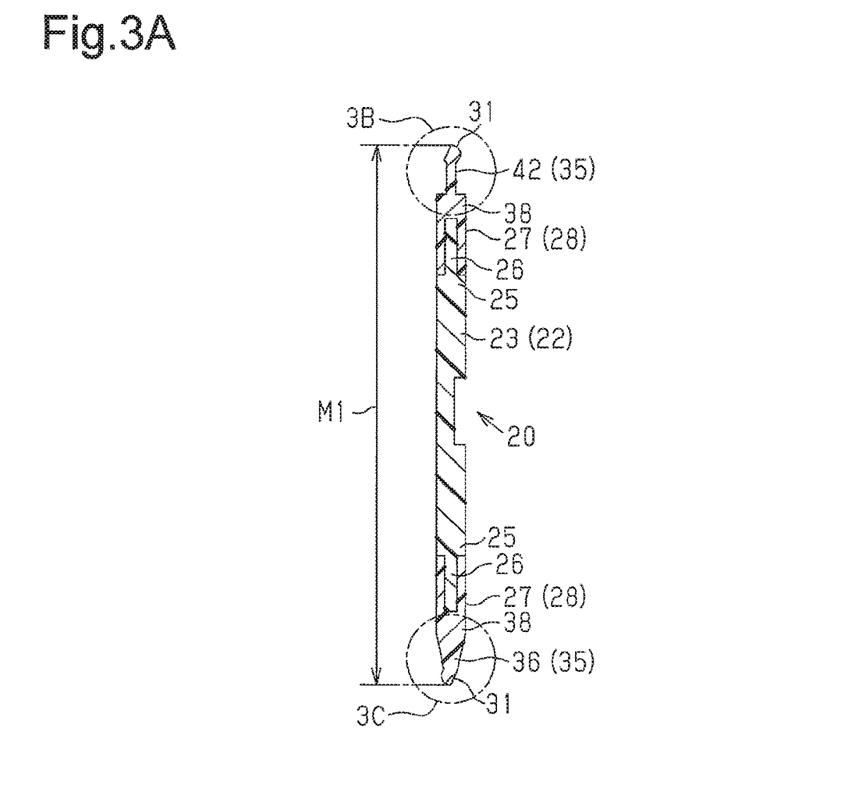
FIG. 3A is a cross-sectional view taken along line 3-3 of FIG. 2.
Figure 3B:
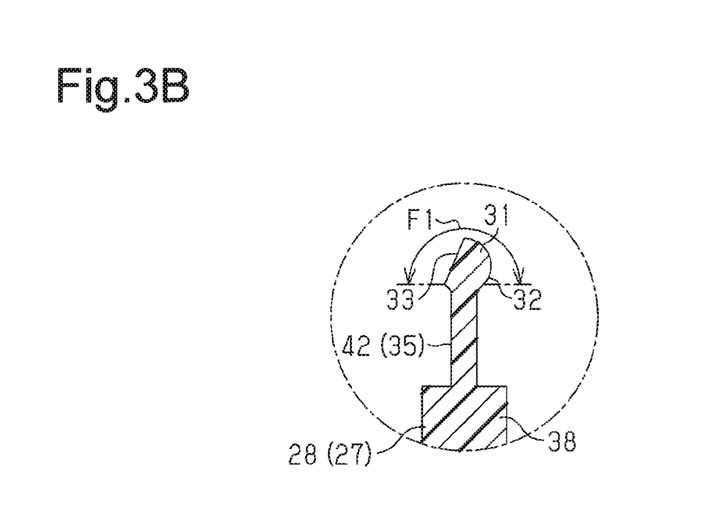
FIG. 3B is an enlarged view showing the section encompassed by circle 3B of FIG. 3A.
Figure 3C:
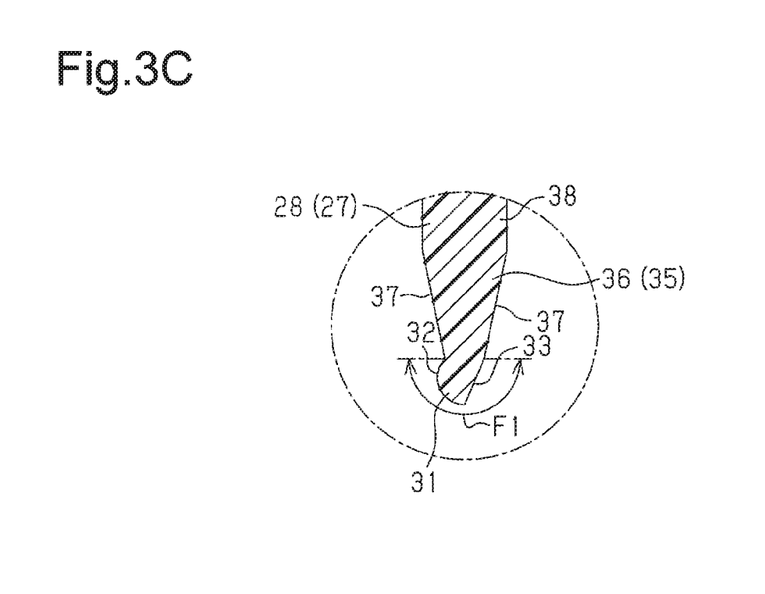
FIG. 3C is an enlarged view showing the section encompassed by circle 3C of FIG. 3A.

As illustrated in FIGS. 3A to 3C, the outer surface of the distal sealing portion 31 is configured mainly by a curved surface 32 and a planar surface 33, which is adjacent to the curved surface 32. The curved surface 32 is arranged on the trailing side in the pivoting direction of the shut-off damper 20 from the opening position to the closing position (the counterclockwise direction as viewed in FIGS. 1 and 4A). The planar surface 33 is arranged on the leading side in this pivoting direction. The curved surface 32 is curved by a uniform curvature to project in the direction opposite to the aforementioned pivoting direction. The planar surface 33 extends continuously to the curved surface 32 in a manner defining an acute angle with respect to the direction in which the opposed side sections 28 of the sealing portion 27 are opposed to each other (the vertical direction as viewed in FIG. 3A). When the shut-off damper 20 is pivoted from the opening position to the closing position, the above-described arrangement of the planar surface 33 causes the planar surface 33 to become parallel or substantially parallel to the inner wall surfaces 14a immediately before the distal sealing portion 31 starts its elastic deformation.

In other words, the planar surface 33 corresponds to the surface formed by cutting away a section on the leading side in the aforementioned pivoting direction, in a manner defining the acute angle with respect to the direction in which the opposed side sections 28 are opposed to each other, from the distal sealing portion 31 that has a substantially circular cross section, the outer surface of which is configured exclusively by the curved surface 32.

The relationship between the position of the curved surface 32 and the position of the planar surface 33 in the distal sealing portion 31 in one of the opposed side sections 28 is opposite to that in the other one of the opposed side sections 28. That is, when the shut-off damper 20 is at the closing position, the planar surface 33 is located upstream of the curved surface 32 in the distal sealing portion 31 in the upper one of the opposed side sections 28 (see FIGS. 3A and 3B). The curved surface 32 is located upstream of the planar surface 33 in the distal sealing portion 31 in the lower one of the opposed side sections 28 (see FIGS. 3A to 3C).

Figure 5A:
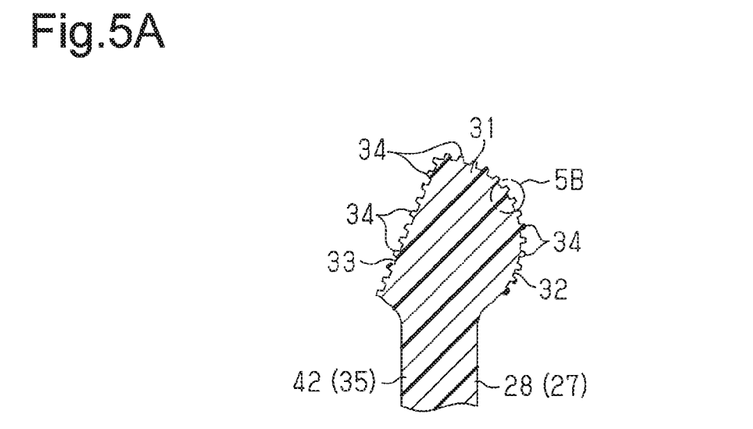
FIG. 5A is a transverse cross-sectional view schematically showing a section of a textured surface of a distal sealing portion of the shut-off damper illustrated in FIG. 1.
Figure 5B:
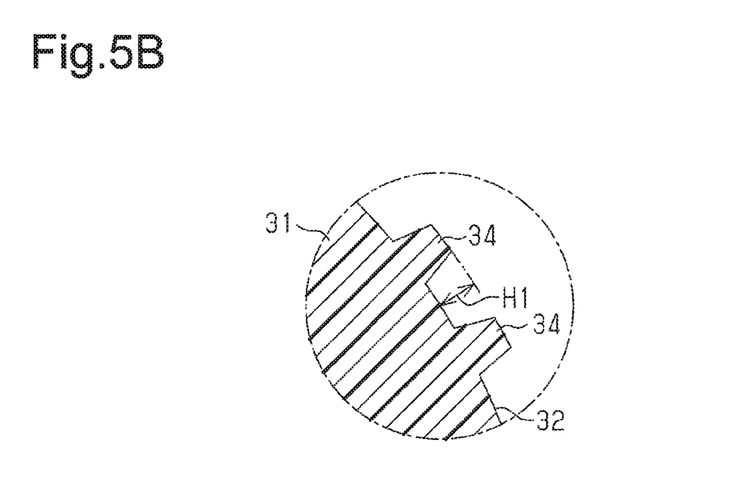
FIG. 5B is an enlarged view showing the section encompassed by circle 5B of FIG. 5A.

With reference to FIGS. 5A and 5B, the outer surface of the distal sealing portion 31 is a textured surface that has raised features 34, each of which has a height H1 of 110 µm±50 µm. In FIGS. 3B and 3C, the textured area of the outer surface of the distal sealing portion 31 is represented by F1. In both a section of the distal sealing portion 31 that extends continuously to a gradually thickening portion 36 and a section of the distal sealing portion 31 that extends continuously to a thin portion 42, as will be described later, the entire planar surface 33 and a substantially entire area of the curved surface 32 are textured surfaces.

As shown in FIGS. 2 and 3A to 3C, the joint portion 35 of the sealing portion 27 is a section that joins the distal sealing portion 31 and the damper body 22 to each other and is flexible. The joint portion 35 has gradually thickening portions 36, each of which has a thickness that gradually increases toward the damper body 22, at positions spaced apart in the circumferential direction of the outer peripheral edge section of the damper body 22. Opposite side surfaces 37 in the thickness direction of each of the gradually thickening portions 36 are flat before the joint portion 35 flexes (is elastically deformed). The thickness of the thickest section of each gradually thickening portion 36 is equal to or substantially equal to the thickness T1 of the aforementioned base portion 23 (see FIG. 1).

In the joint portion 35, thin portions 42, each of which has a thickness 13 (see FIG. 1) unequal to the thickness of each gradually thickening portion 36, are each arranged between corresponding adjacent ones of the gradually thickening portions 36. A stepped portion 41 is formed between each of the gradually thickening portions 36 and an adjacent one of the thin portions 42. The thickness 13 of each thin portion 42 is uniform throughout the thin portion 42 unlike the thickness of each gradually thickening portion 36. The thickness T3 is even smaller than the thickness of the thinnest portion of the gradually thickening portion 36. The gradually thickening portions 36 and the thin portions 42 are arranged alternately along the outer peripheral edge section of the damper body 22.

The joint portion 35 has a uniform thickness portion 38 between the damper body 22 and the gradually thickening portions 36 and between the damper body 22 and the thin portions 42. The thickness of the uniform thickness portion. 38 is equal or substantially equal to the thickness T1 of the base portion 23. In the opposed side sections 28 of the sealing portion 27, the uniform thickness portion 38 covers the thin plate portion 26 of the damper body 22.

The shut-off damper 20, which is configured in the above-described manner, is formed by two-color molding, which is a type of plastic molding. In the two-color molding, multiple stages of plastic pouring processes are carried out using several types of metal molds while rotating basic metal molds. That is, in a single cycle of a molding step, two types of plastic are injected sequentially to be layered with each other. Using the two-color molding method, the damper body 22 and the sealing portion 27 are sequentially molded. In this manner, the sealing portion 27 is coupled to the damper body 22 simultaneously when the sealing portion 27 is molded. It is thus unnecessary to perform a step of forming the damper body 22 and the sealing portion 27 separately from each other and then assembling the sealing portion 27 and the damper body 22 together. This is advantageous for decreasing the manufacturing cost.

The operation and advantages of the present embodiment will now be described.

<When Shut-Off Damper 20 is at Closing Position>.

Figure 4A:
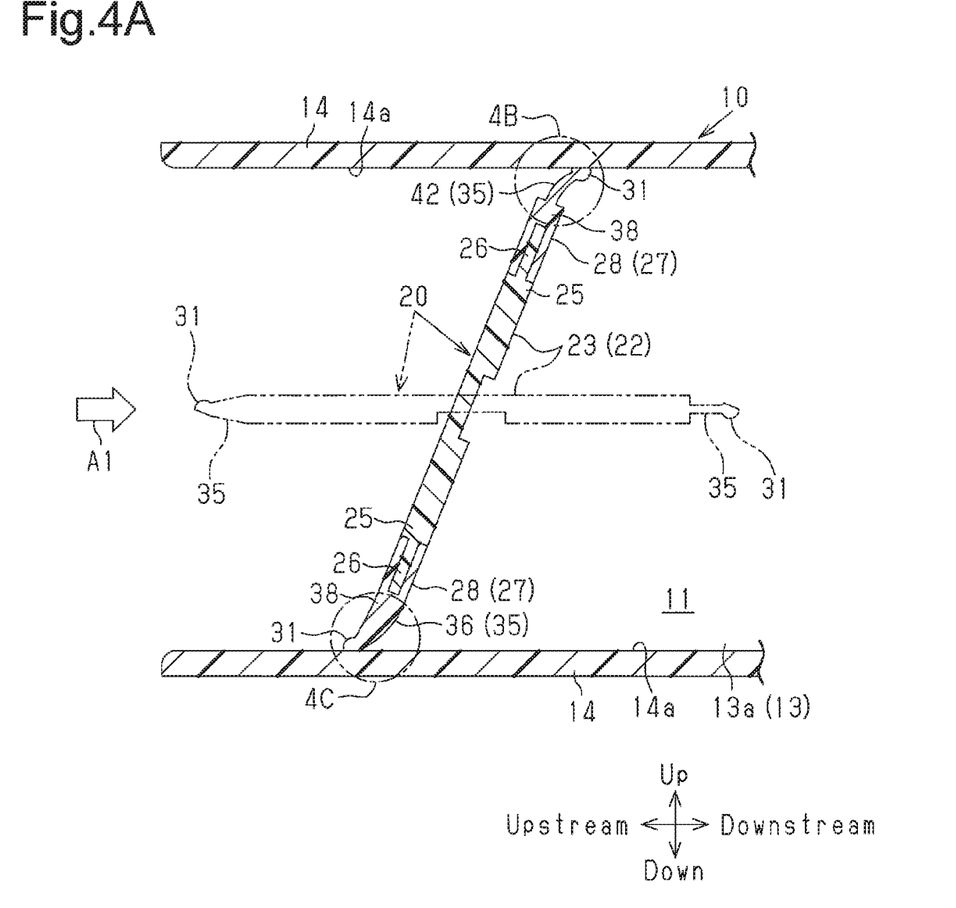
FIG. 4A is a transverse cross-sectional view showing the internal structure of a section of the air-conditioning register illustrated in FIG. 1 at the time the shut-off damper is located at a closing position.
Figure 4B:
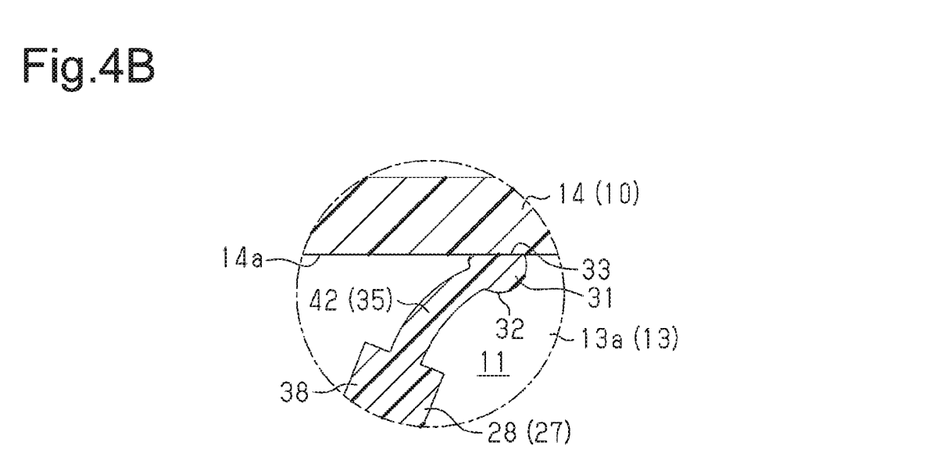
FIG. 4B is an enlarged view showing the section encompassed by circle 4B of FIG. 4A.
Figure 4C:
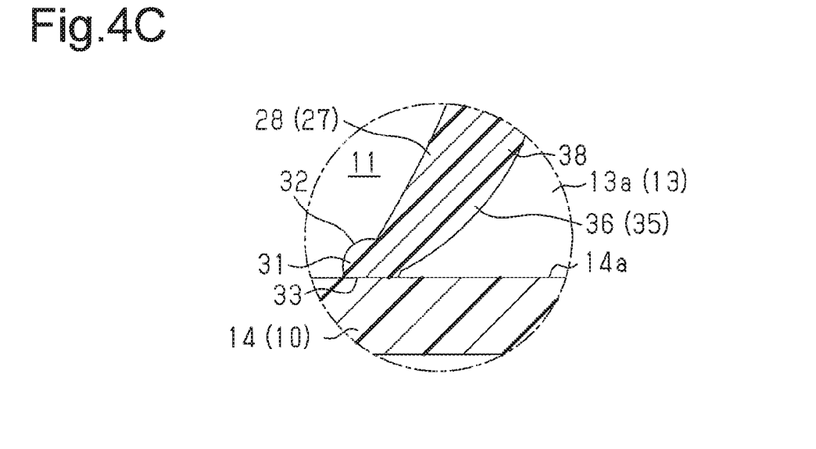
FIG. 4C is an enlarged view showing the section encompassed by circle 4C of FIG. 4A.

When located at the closing position as represented by the solid lines in FIG. 4A, the shut-off damper 20 is in a state inclined with respect to the two transverse wall portions 14.

At this time, the damper body 22, made of PP, which is a hard plastic material, functions as the framework portion of the shut-off damper 20. The gradually thickening portions 36 and the thin portions 42 of each opposed side section 28, which are made of a material (TPO) softer than PP of the damper body 22, are each in a flexed (elastically deformed) state. At least the planar surface 33 of the distal sealing portion 31 in each opposed side section 28 is thus pressed against the corresponding inner wall surface 14a by the elastic restoration force of the corresponding gradually thickening portions 36 and the elastic restoration force of the corresponding thin portions 42.

Each gradually thickening portion 36 has a rigidity that is increased by the thickness that gradually increases toward the dancer body 22. The elastic restoration force of the gradually thickening portion 36 is thus great. As a result, the sections of the distal sealing portion 31 that extend continuously to the gradually thickening portions 36 are pressed against the corresponding inner wall surfaces 14a with comparatively great intensity.

On the other hand, the thickness T3 of each thin portion 42 is smaller than the thickness of the thinnest portion of each gradually thickening portion 36 and is uniform. The rigidity of the thin portion 42 is thus lower than the rigidity of each gradually thickening portion 36. This facilitates elastic deformation of the thin portions 42 compared to that of the gradually thickening portions 36. As a result, the sections of the distal sealing portion 31 that extend continuously to the thin portions 42 in each opposed side section 28 are pressed against the inner wall surface 14a of the corresponding transverse wall portion 14 by less intense force than the sections that extend continuously to the gradually thickening portions 36.

The distal sealing portion 31 in each opposed side section 28 is elastically deformed in a state in which at least the planar surface 33 is held in contact with the inner wall surface 14a of the corresponding transverse wall portion 14. This decreases the volume of the sections subjected to elastic deformation compared to a case in which the distal sealing portion 31 lacks the planar surface 33 in the opposed side sections 28, or, in other words, the distal sealing portion 31 has the above-described curved surface 32 exclusively and thus has a substantially circular cross section. Correspondingly, the surface area by which the distal sealing portion 31 contacts the inner wall surface 14a of each transverse wall portion 14 while being elastically deformed is decreased. As a result, when the shut-off damper 20 is pivoted from the closing position toward the opening position, the friction force acting between the distal sealing portion 31 and each inner wall surface 14a is decreased.

In the outer surface of the distal sealing portion 31, the textured surface, which has the raised features 34 each having the height H1 of 110 µm±50 µm, has slight bumps and dents. In the outer surface of the distal sealing portion 31, at least the entire planar surface 33 textured in this manner. This forms a clearance between each inner wall surface 14a and the planar surface 33 in a state in which at least the planar surface 33 of the distal sealing portion 31 is held in contact with the inner wall surfaces 14a of the transverse wall portions 14. The clearance restrains production of a substantial vacuum in the space between the distal sealing portion 31 and each inner wall surface 14a. The distal sealing portion 31 is thus unlikely to adhere to each inner wall surface 14a, or, in other words, to stick to the inner wall surface 14a in a suction-cup-like manner.

By setting the height H1 of each of the raised features 34 on the textured surface in the aforementioned range, leakage of the air A1 on the upstream side with respect to the shut-off damper 20 at the closing position from the clearance between each inner wall surface 14a and the planar surface 33 is restricted to an insignificant level.

When the shut-off damper 20 is at the closing position, variations in the dimensions or shape of the distal sealing portion 31 may cause elastic deformation of the distal sealing portion 31 in a state in which, in addition to the planar surface 33, at least a section of the curved surface 32, or, more specifically, at least a boundary portion of the curved surface 32 with respect to the planar surface 33, is held in contact with the inner wall surface 14a of each transverse wall portion 14. However, in the present embodiment, in which a substantially entire area of the curved surface 32 of the distal sealing portion 31 is textured, a clearance is formed also between each section of the curved surface 32 in contact with the inner wall surface 14a of the corresponding transverse wall portion 14 and the inner wall surface 14a. This restrains sticking of the curved surface 32 to the inner wall surface 14a in a suction-cup-like manner.

<When Shut-Off Damper 20 is Pivoted from Closing Position to Opening Position>

To open the airflow passage 11, the shut-off damper 20 is pivoted from the closing position to the opening position. As has been described, the planar surface 33 in each opposed side section 28 decreases the surface area by which the distal sealing portion 31 contacts the inner wall surface 14a of each transverse wall portion 14 while being elastically deformed. The friction force acting between the distal sealing portion 31 and each inner wall surface 14a is thus decreased. Also, as has been described, the raised features 34 restrain sticking. This restrains noise generation at the time the distal sealing portion 31 is separated (peeled off) from the inner wall surfaces 14a when the shut-off damper 20 is pivoted in the above-described manner.

Further, at this time, the silicone oil used in the sealing portion 27 functions as a lubricant. This further decreases the friction force between the distal sealing portion 31 and each inner wall surface 14a when the shut-off damper 20 is pivoted from the closing position to the opening position. Separation of the distal sealing portion 31 from the inner wall surfaces 14a is thus further facilitated. This further restrains noise generation at the time the distal sealing portion 31 is separated from the inner wall surfaces 14a.

<When Shut-Off Damper 20 is at Opening Position>

After the shut-off damper 20 is pivoted to the opening position as represented by the solid lines in FIG. 1, the shut-off damper 20 is in a state parallel or substantially parallel to the transverse wall portions 14 in the middle section between the transverse wall portions 14. The airflow passage 11 is thus open to a great extent.

The air A1 in the middle section between the transverse wall portions 14 flows along the shut-off damper 20. Some of the A1 that passes over the distal sealing portion 31 is allowed to gradually change the flow direction in a smooth manner by flowing along the curved surface 32. The rest of the air A1 that passes over the distal sealing portion 31 is allowed to change the flow direction only slightly by flowing along the planar surface 33, which is inclined at the acute angle with respect to the direction in which the opposed side sections 28 are opposed to each other. This decreases likeliness that the air A1 will intensely peel off and thus hamper its flow, unlike a case in which the outer surface as a whole is configured by multiple planar surfaces and boundary portions between adjacent ones of the planar surfaces are angular.

If the thickness of the sealing portion 27 as a whole becomes gradually smaller farther from the outer peripheral edge section of the damper body 22, the rigidity of the section farthest from the outer peripheral edge section of the damper body 22 may be insufficient in certain cases. In these cases, when the shut-off damper 20 is at the opening position, the air A1 that flows along the shut-off damper 20 vibrates the aforementioned section of the sealing portion 27, which may generate chattering noise.

In contrast, the configuration of the present embodiment increases the rigidity of the section of the sealing portion 27 farthest from the outer peripheral edge section of the damper body 22. As a result, when the shut-off damper 20 is at the opening position, the aforementioned section of the sealing portion 27 is unlikely to vibrate even if the air A1 flows along the shut-off damper 20. This restrains generation of the chattering noise by such vibration.

<When Shut-Off Damper 20 is Pivoted from Opening Position to Closing Position>

If the thickness of the sealing portion 27 as a whole becomes gradually smaller farther from the outer peripheral edge section of the damper body 22, Karman vortex may be produced between the sealing portion 27 and the inner wall surface 14a of each transverse wall portion 14 immediately before the shut-off damper 20 reaches the closing position while being pivoted from the opening position to the closing position. This may generate wind roar.

In contrast, the configuration of the present embodiment causes turbulence in the flow of the air A1 between the distal sealing portion 31 and each inner wall surface 14a immediately before the shut-off damper 20 reaches the closing position while being pivoted from the opening position to the closing position. As a result, the Karman vortex is unlikely to be produced and generation of the wind roar is restrained.

Also, since the thickness 13 of each thin portion 42 is smaller than the thickness of the thinnest portion of each gradually thickening portion 36 and is uniform, elastic deformation of the thin portion 42 is facilitated compared to elastic deformation of the gradually thickening portion 36. This decreases the manipulation load for pivoting the shut-off damper 20 to the closing position and thus enhances manipulation comfort, compared to a case in which the joint portion 35 lacks the thin portions 42.

The above-described embodiment may be modified as follows.

<Distal Sealing Portion 31>

The curved surface 32 of the distal sealing portion 31 may be configured by a plurality of curved surfaces that are curved at mutually different curvatures.

The raised features 34 of the distal sealing portion 31 need only be formed at least on the planar surface 33 of the outer surface of the distal sealing surface 31. That is, the raised features 34 do not necessarily have to be formed on the curved surface 32 of the outer surface of the distal sealing portion 31. Alternatively, the raised features 34 may be formed exclusively on the planar surface 33 and on a boundary portion of the curved surface 32 with respect to the planar surface 33. This arrangement is allowed due to the fact that the section of the curved surface 32 of the distal sealing portion 31 that is most likely to be elastically deformed is the boundary portion with respect to the planar surface 33.

In the distal sealing portion 31 in each joint side section 29, the planar surface 33 may be omitted and the outer surface of the distal sealing portion 31 may be configured only by the curved surface 32.

<Joint Portion 35>

The thicknesses of the gradually thickening portions 36 of the joint portion 35 may be either equal or non-equal. The thicknesses of the thin portions 42 may be either equal or non-equal.

The uniform thickness portion 38 of the joint portion 35 may be omitted.

The opposite side surfaces 37 of each gradually thickening portion 36 in the thickness direction do not necessarily have to be flat. For example, each of the opposite side surfaces 37 may be curved as long as the thickness of the gradually thickening portion 36 gradually increases toward the damper body 22. That is, the opposite side surfaces 37 may be curved to protrude either separately from each other or toward each other.

Unlike the above-described embodiment, the joint portion 35 may be configured only by the gradually thickening portions 36 at least in the opposed side sections 28. In this case, the gradually thickening portions 36 are arranged at least along the full length of each opposed side section 28. This allows the distal sealing portion 31 to be intensely pressed against the inner wall surfaces 14a of the transverse wall portions 14 in a large circumferential area of the outer peripheral edge section of the damper body 22 at least in each opposed side section 28.

Unlike the above-described embodiment, the joint portion 35 may be configured only by the thin portions 42 at least in the opposed side sections 28. In this case, the thin portions 42 may be arranged at least along the full length of each opposed side section 28.

<Fins>

At least either the upstream fins 15 or the downstream fins 17 may be omitted. Alternatively, other fins may be arranged in addition to the upstream fins 15 and the downstream fins 17.

<Location of Use>

The above-described air-conditioning register may be incorporated in the passenger compartment at a location different from that in the instrument panel, which is, for example, a location in the dashboard.

The air-conditioning register is employable in not only vehicles but also for a broad range of use.

<Other Modifications>

The damper body 22 and the sealing portion 27 may be formed separately from each other. In this case, when manufacturing the shut-off damper 20, a step of assembling the sealing portion 27 with the outer peripheral edge section of the damper body is necessary.

It is preferable that the content of silicone oil in the sealing portion 27 be set in correspondence with the extent of decrease of the friction force needed between the distal sealing portion 31 and the inner wall surface 14a of each transverse wall portion 14.

The above embodiments are intended to be illustrative, and the present invention is not limited to the above-described embodiments. Various alternatives, modifications and variations are possible to the disclosed exemplary embodiments without departing from the spirit and scope of the present invention. For example, the subject matter of the present invention may exist in fewer features than all of the features of the particular embodiments disclosed. The claims are incorporated into the detailed description and each claim by itself claims a separate embodiment. The scope of the invention is intended to embrace all such alternatives, modifications, and variations, along with all equivalents thereof, within the scope of the claims.

The invention claimed is:

1. An air-conditioning register comprising:
a tubular retainer that has an airflow passage; and
a shut-off damper arranged in the retainer, wherein the shut-off damper is pivoted about a damper shaft between an opening position for opening the airflow passage and a closing position for closing the airflow passage, wherein
the shut-off damper has a damper body having an outer peripheral edge section and a sealing portion that surrounds the outer peripheral edge section and is formed of a softer material than the damper body,
the sealing portion includes two opposed side sections that are opposed to each other with the damper shaft located between the opposed side sections and extend parallel to the damper shaft and a distal sealing portion that is arranged at a position in each of the opposed side sections farthest from the outer peripheral edge section,
the distal sealing portion contacts an inner wall surface of the retainer in an elastically deformed state at the closing position and is configured such that, if elastic deformation of the sealing portion did not happen, a section of each opposed side section would extend into the inner wall surface of the retainer at the closing position,
the distal sealing portion includes a curved surface and a planar surface that extends continuously to the curved surface, wherein
the curved surface is arranged on a trailing side in a pivoting direction of the shut-off damper from the opening position to the closing position in a manner projecting in the direction opposite to the pivoting direction,
the planar surface is arranged on a leading side in the pivoting direction in a manner defining an acute angle with respect to a direction in which the two opposed side sections are opposed to each other,
at least the planar surface of the distal sealing portion has a plurality of raised features protruding from the planar surface of the distal sealing portion, each having a height of 110 μm±50 μm, and
the plurality of raised features is distributed across an entirety of the planar surface of the distal sealing portion.

2. The air-conditioning register according to claim 1, wherein at least a boundary portion of the curved surface of the distal sealing portion with respect to the planar surface has the plurality of raised features.

3. The air-conditioning register according to claim 1, wherein the sealing portion includes a flexible joint portion that joins the distal sealing portion and the damper body to each other.

4. The air-conditioning register according to claim 1, wherein
the damper body is made of polypropylene, and
the sealing portion is formed as a single component with the damper body using a thermoplastic elastomer.

5. The air-conditioning register according to claim 1, wherein the sealing portion contains a silicone oil.

6. The air-conditioning register according to claim 1, wherein
the distal sealing portion includes a flexible joint portion that joins the distal sealing portion to the damper body, and
the flexible joint portion has laterally alternating uniform thickness sections and gradually thickening sections that gradually increase in thickness from the distal sealing portion to the damper body, and a stepped portion that is formed laterally between one of the gradually thickening sections and an adjacent one of the uniform thickness sections.

7. The air-conditioning register according to claim 1, wherein the planar surface becomes parallel to the inner wall surface of the retainer before the distal sealing portion starts to elastically deform.

8. The air-conditioning register according to claim 7, wherein at least a boundary portion of the curved surface of the distal sealing portion with respect to the planar surface has the plurality of raised features.

9. The air-conditioning register according to claim 7, wherein the sealing portion includes a flexible joint portion that joins the distal sealing portion and the damper body to each other.

10. The air-conditioning register according to claim 7, wherein
the damper body is made of polypropylene, and
the sealing portion is formed as a single component with the damper body using a thermoplastic elastomer.

11. The air-conditioning register according to claim 7, wherein the sealing portion contains a silicone oil.

12. The air-conditioning register according to claim 7, wherein
the distal sealing portion includes a flexible joint portion that joins the distal sealing portion to the damper body, and
the flexible joint portion has laterally alternating uniform thickness sections and gradually thickening sections that gradually increase in thickness from the distal sealing portion to the damper body, and a stepped portion that is formed laterally between one of the gradually thickening sections and an adjacent one of the uniform thickness sections.

* * * * *